US008521595B2

(12) United States Patent
Tolompoiko et al.

(10) Patent No.: US 8,521,595 B2
(45) Date of Patent: Aug. 27, 2013

(54) DYNAMIC INTERACTION MAPPING FOR ONLINE ADVERTIZING

(75) Inventors: Aleksei Tolompoiko, Cumming, GA (US); Justin Haygood, Marietta, GA (US); Phillip J. Markert, Jr., Kennesaw, GA (US); Ryan A. Caskey, Dallas, GA (US); Robert W. Smith, White, GA (US)

(73) Assignee: Eyewonder, LLC, Atlanta, GA (US)

( * ) Notice: Subject to any disclaimer, the term of this patent is extended or adjusted under 35 U.S.C. 154(b) by 103 days.

(21) Appl. No.: 13/101,914

(22) Filed: May 5, 2011

(65) Prior Publication Data
US 2012/0022951 A1 Jan. 26, 2012

Related U.S. Application Data

(60) Provisional application No. 61/366,482, filed on Jul. 21, 2010.

(51) Int. Cl.
*G06Q 30/00* (2012.01)
(52) U.S. Cl.
USPC .................................................. 705/14.68
(58) Field of Classification Search
USPC ............................................... 386/46
See application file for complete search history.

(56) References Cited

U.S. PATENT DOCUMENTS

| 7,310,609 | B2 | 12/2007 | Middleton, III et al. |
| 2007/0266305 | A1* | 11/2007 | Cong et al. ................. 715/500.1 |
| 2008/0040473 | A1 | 2/2008 | Larsson et al. |
| 2010/0014825 | A1* | 1/2010 | Curtis et al. .................... 386/46 |

FOREIGN PATENT DOCUMENTS

| JP | 2003-114904 A | 4/2003 |
| WO | WO 01/67214 A2 | 9/2001 |

\* cited by examiner

*Primary Examiner* — Saba Dagnew
(74) *Attorney, Agent, or Firm* — Kilpatrick Townsend & Stockton LLP

(57) ABSTRACT

A method and system for dynamic interaction mapping for online advertising is disclosed in one embodiment. Metric information relating to interaction with a creative is received from a number of user computer from across the Internet. The metric information is correlated to playback time of the creative and position of interaction with respect to the creative. A graphic overlay or heatmap is formulated according to display options, event triggers, playback time and position of the interaction relative to the creative. The graphic overlay is presented in a way that the graphic overlay changes according to playback time. Display options include creative transparency, graphic overlay transparency, selection from a number of interactions and/or events, selection of one or more panels, choosing clicks and/or rollovers, choice of different colors or shading for different interaction, etc.

20 Claims, 12 Drawing Sheets

DYNAMIC INTERACTION MAPPING FOR ONLINE ADVERTIZING

This application claims the benefit of and is a non-provisional of U.S. Provisional Application Ser. No. 61/366,482 filed on Jul. 21, 2010, entitled "DYNAMIC INTERACTION MAPPING FOR ONLINE ADVERTIZING," which is hereby expressly incorporated by reference in its entirety for all purposes.

BACKGROUND

This disclosure relates in general to online advertizing and, but not by way of limitation, to interaction tools for analyzing online advertizing.

Online advertizing is gaining market share from other ways that companies reach their consumers. Advertisers are curious about how potential customers interact with their ads. Present metrics track clickthoughs on various regions or buttons on an ad. With ads being two dimensional, meaningfully determining how consumers interact with an ad is difficult.

Display ads on the web are becoming interactive. Their shape and functions can change in a rich way. Interaction with dynamic display ads is difficult analyze. Buttons may move over time and/or as the consumer interacts. Some interaction does not result in a clickthrough, but is also interesting to analyze. Panels and movement of the dynamic display ad can branch the rich display ad in different directions

SUMMARY

In one embodiment, the present disclosure provides a method and system for dynamic interaction mapping for online advertizing. Metric information relating to interaction with a creative is received from a number of user computer from across the Internet. The metric information is correlated to playback time of the creative and position of interaction with respect to the creative. A graphic overlay or heatmap is formulated according to display options, event triggers, playback time and position of the interaction relative to the creative. The graphic overlay is presented in a way that the graphic overlay changes according to playback time. Display options include creative transparency, graphic overlay transparency, selection from a number of interactions and/or events, selection of one or more panels, choosing clicks and/or rollovers, choice of different colors or shading for different interaction, etc.

In another embodiment, a method for dynamic interaction mapping for online advertizing is disclosed. Metric information is received relating to interaction with a creative from across the Internet for a plurality of viewers. The metric information is correlated to playback time of the creative and position relative to the creative. Display options are determined. A graphic overlay is formulated according to display options, playback time and position. The graphic overlay is sent for presentment, wherein the graphic overlay changes according to playback time.

In yet another embodiment, one or more physical machine-readable media having machine-executable instructions configured for dynamic interaction mapping for online advertizing is disclosed. The one or more physical machine-readable media comprising code for: receiving metric information relating to interaction with a creative from across the Internet for a plurality of viewers, wherein the metric information is correlated to playback time of the creative and position relative to the creative; determining display options; formulating a graphic overlay according to display options, playback time and position; and sending the graphic overlay for presentment, wherein the graphic overlay changes according to playback time.

In still another embodiment, a metric display system for dynamic interaction mapping for online advertizing is disclosed. The metric display system comprising including a memory and a processor. The processor is configured to: receive metric information relating to interaction with a creative from across the Internet for a plurality of viewers, wherein the metric information is correlated to playback time of the creative and position relative to the creative; determine display options; formulate a graphic overlay according to display options, playback time and position; and send the graphic overlay for presentment, wherein the graphic overlay changes according to playback time.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, a method and system for dynamic interaction mapping for online advertizing is disclosed. Metric information relating to interaction with a creative is received from a number of user computer from across the Internet. The metric information is correlated to playback time of the creative and position of interaction with respect to the creative. A graphic overlay or heatmap is formulated according to display options, event triggers, playback time and position of the interaction relative to the creative. The graphic overlay is presented in a way that the graphic overlay changes according to playback time. Display options include creative transparency, graphic overlay transparency, selection from a number of interactions and/or events, selection of one or more panels, choosing clicks and/or rollovers, choice of different colors or shading for different interaction, etc.

Figure 1:
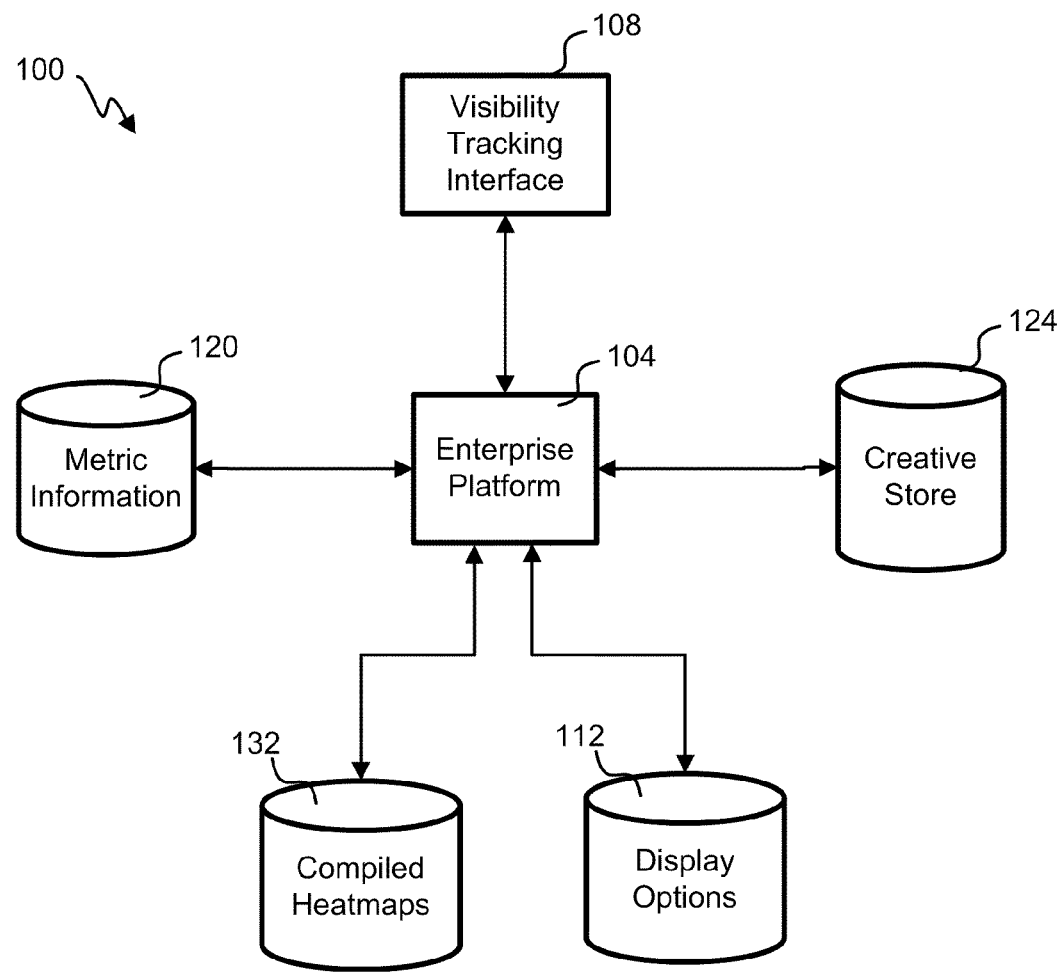
FIG. 1 depicts a block diagram of an embodiment of a metric display system for representing interaction with creatives for information gathered from viewers.

Referring first to FIG. 1, an embodiment of a metric display system 100 for representing interaction with creatives for information gathered from viewers. Events can also be displayed. An event is anything that an ad container of the creative can observe on the viewer's computing device, for example, closing a browser window, clicking elsewhere on a page, changing preferences or controls in the ad container, ad blocking software activity, etc. In this embodiment, a creative cannot track windows events, events outside the current browser tab or window, changes to the preferences of the web browser, but a browser plug-in or application software could be loaded onto the viewer's computing device to track these in other embodiments.

The metric display system 100 controls the process of gathering information and displaying it to allow analysis of interaction with creatives. Creatives, which can be dynamic or static, are held in the creative store 124. Ad servers or origin servers, remote to the metric display system 100, may store the creatives in other embodiments. The creatives might have any number of active elements that move or expand into panels, audio and or video, gaming features, etc. that change during playback of the creative. The metric display system 100 could be a one or more computers or a server hosted in the cloud. Storage for the metric information 120, creative store 124, compiled heatmaps 132, display options 112 could be combined or distributed in various ways on physical media.

Metric information 120 is gathered during delivery of the creatives to viewers. The metric information is gathered for interaction and movement of the cursor relative to the creative. Reporting of metric information can be periodic or sporadic. The metric information is correlated to playback time for any dynamic creative, i.e., a creative that changes as part of playback in this embodiment although some embodiments may not be correlated to playback time of the creative. Metric information includes clicks, rollovers and other interaction by the viewer with the creative.

The metric information can be gathered by trackers on an origin server, content delivery network (CDN), and/or the metric display system 100. Various log files or reports are gathered and processed by a enterprise platform 104 for storage as metric information 120. Historical archive of the metric information 120 can be done for different amounts of time to allow queries of a variable amount of past information. The enterprise platform 104 could be software resident on a computer system or hosted in the cloud.

Each individual interaction with the dynamic creative is stored to retain clicks, rollovers, cursor movement against a timeline as metric information 120. The granularity of this interaction be varied and archived for differing amounts of time. Additionally, the way that the dynamic creative reacts to the individual interaction is stored. With the individual interaction and the reaction of the dynamic creative, an individual experience can be replayed from the metric information 120.

The user of the metric display system 100 interacts with the enterprise platform 104 through a visibility tracking interface 108. Creatives are displayed with overlay graphics representing the interaction to the user through the visibility tracking interface 108. The user can choose any number of display options to customize how the creative with the overlay graphics is presented.

Heatmaps and graphic overlays can be precompiled or compiled after being requested and stored as compiled heatmaps 132. This embodiment compiles some or all of the graphic overlays prior to request. There can be different versions of compiled heatmaps 132 for the different display options 112. In some cases, some heatmaps are compiled and others are compiled after being requested or at runtime.

Figure 2A:
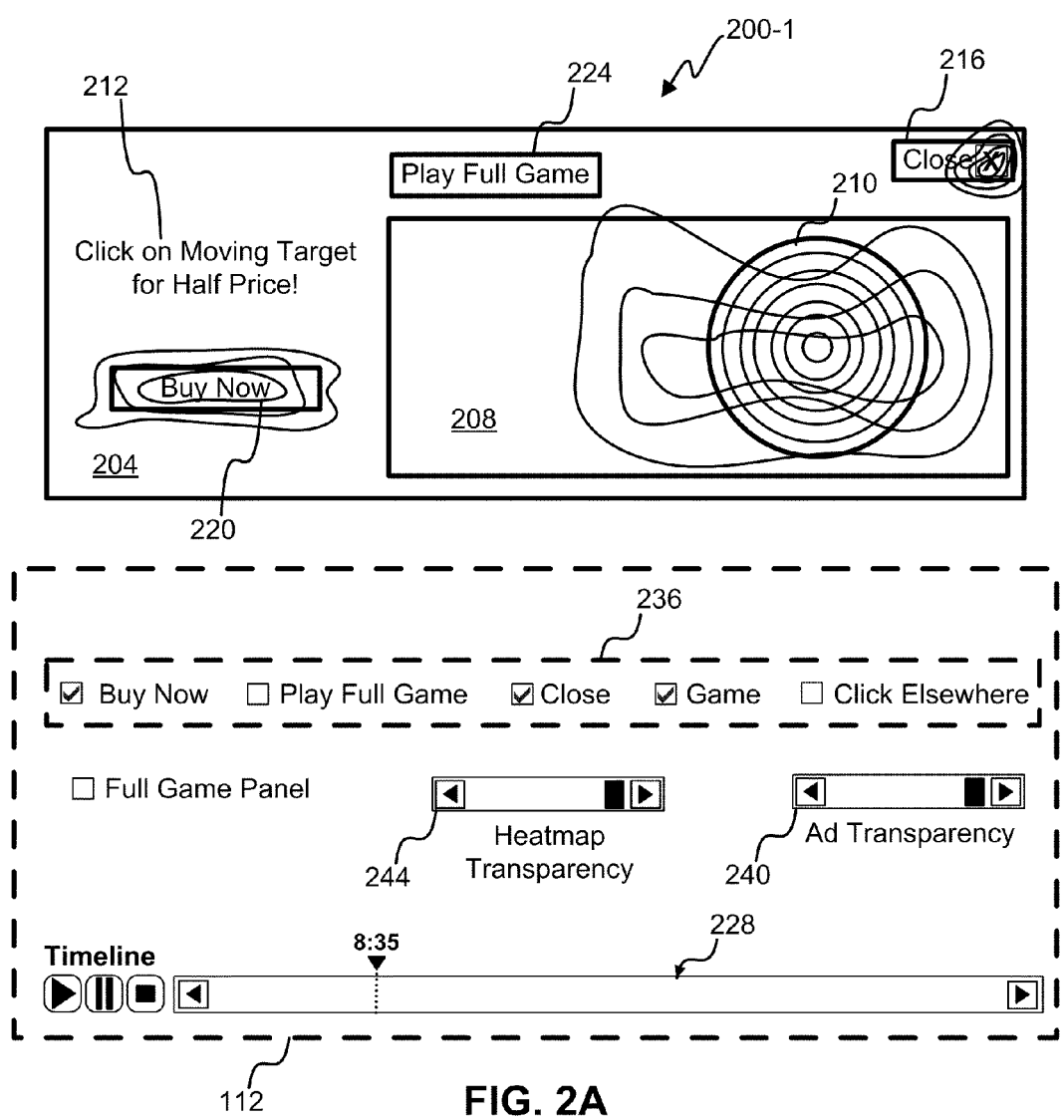
FIGS. 2A through 2H depict diagrams of embodiments of a view from the visibility tracking interface.

With reference to FIG. 2A, an embodiment of a view 200-1 from the visibility tracking interface 108 is shown. A graphic overlay in the form of a heatmap is presented with a creative 204 in the background. A description 212 has text relating to the ad, in this case, describing a game element 208. Viewers can click on a moving target 210 to click through to the advertiser's web site or can activate a "buy now" button control 220. A "play full game" button control 224 allows expansion of the game element 208 into another panel. A "close" button control 216 allows closing the creative 200 or minimizing its size.

A given creative 204 has a number of controls that are each tracked in the metric information 120 both a clicks and rollovers. Other interaction that may be possible can be part of the metric information 120, for example, closing the browser window, clicking elsewhere on the web page, and ad blocking software activity. A control selection area 236 allows choosing the interaction that appears in the graphic overlay. In this example, the "buy now" button control 220, the "close" button control 216 and the game element 208 interaction are all displayed as a heatmap. All the interaction is displayed without differentiation in this embodiment, but other embodiments could use different colors for each chosen in the control selection area 236.

Different panels designed into the creative 204 can be selected for display. In this embodiment, a full game panel check box 232 can be selected to view the creative 204 with the panel active. The graphic overlay for the panel would be shown if that is selected in the control selection area 236. The panel in this creative 204 is detailed below in relation to FIG. 2E.

Transparency of the graphic overlay or the creative can be adjusted with sliders 240, 244 in this embodiment. Moving the slider to the left has more transparency and to the right is more opaque. Both transparencies 240, 244 can be adjusted independently of each other. Some embodiments could use dashed lines instead of translucency. Other embodiments flatten the colors in the creative to a single color that contrasts the graphic overlay to differentiate the two. This embodiment can optionally use the transparency adjustment for the creative 204 and/or the graphic overlay.

The creative 204 in this embodiment is dynamic in that it changes over time. The changes could branch in different directions at different times. In this example, the target 210 moves according to a predetermined pattern and the game element 208 can expand out into a larger panel. A timeline control 228 allows picking any moment in the playback to view the graphic overlay at that moment. Here, playback is at eight seconds and thirty-five hundredths. The user can play back the creative and pause or stop it at any point. During playback, pause or stop, all the other options 236, 232, 240, 244 can be interacted with to adjust in real time what is displayed for the user. In some embodiments, the creative is static over time and the graphic overlay could be also. Even where the creative 204 is dynamic, the graphic overlay could be an aggregate of all interaction over time to obviate the need for the timeline control 228.

A user may want to interact with dynamic elements in different ways. Some embodiments allow moving the dynamic elements by dragging them with the cursor to show how the viewers interacted with the dynamic element while it was in that position. For example, the moving target 210 can be dragged to any valid position in the game element 208 and the interaction in that position can be displayed even if it was in that location several times during the timeline 228.

Branching of interaction can be analyzed by the viewer. For example, the panel for the game element 208 can be activated during playback even though only a fraction of the viewers may have that panel open at a given moment. The panel can be more translucent if few viewers have it open or it could be more opaque if many viewers have it open during that moment in the playback timeline. With the panel open, the point in playback along the timeline 228 can be dragged in either direction to see how the panel fades in and out to give an indication to the user on how popular use of the panel is at any given point in playback.

Embodiments could have more complex dynamic elements that can overlay each other in all the permutations on how things could branch. For example, a car could be part of a dynamic creative that allows rotation along two or three axis. All the positions could be overlaid according to their popularity to give some correlation to the graphic overlay. The user could grab the car element and fix it in one location to see the graphic overlay for all the instances of the car in that position regardless of playback point. A histogram could be displayed to show the various points in playback where that position occurred.

Figure 2B:
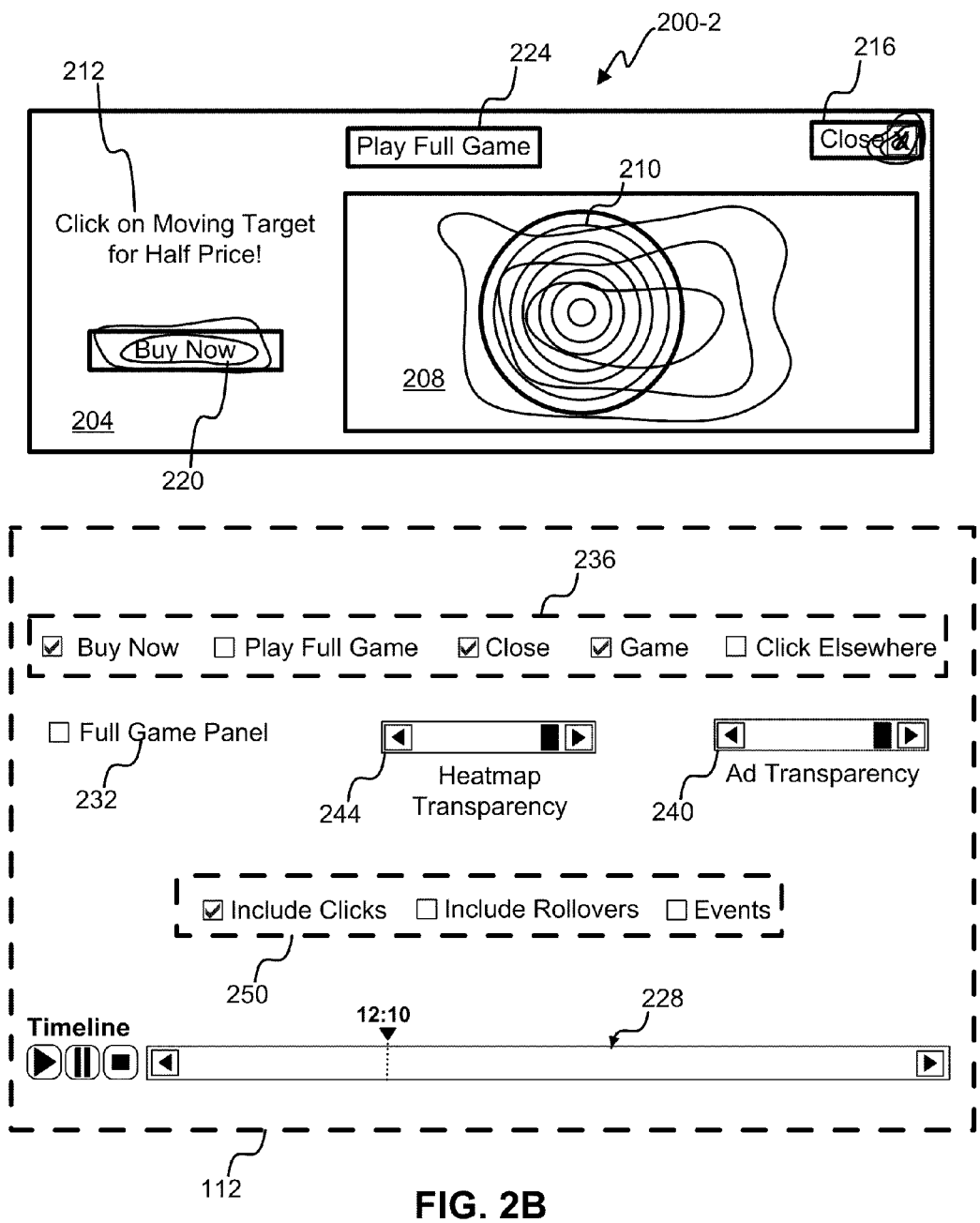

Referring next to FIG. 2B, an embodiment of another view 200-2 from the visibility tracking interface 108 is shown. This embodiment adds a tracking category control 250 in addition to the interface elements of FIG. 2A. The user can select what types of things are part of the information used for the graphical overlay. Clicks on the creative 204, rollovers of any element in the creative or events can be individually selected by the user.

Events can be selected from any of the possible things that can be observed by the ad container of the creative. For example, an event could be defined that indicates when the ad window is shut during a time range during the day. Where there are multiple events, they can be individually activate or deactivate. Simple computing languages or scripts could be used to define an event in any possibly way. Playback in this example has moved forward to twelve seconds and ten hundredths where the target is moved to the left relative to the example of FIG. 2A.

Figure 2C:
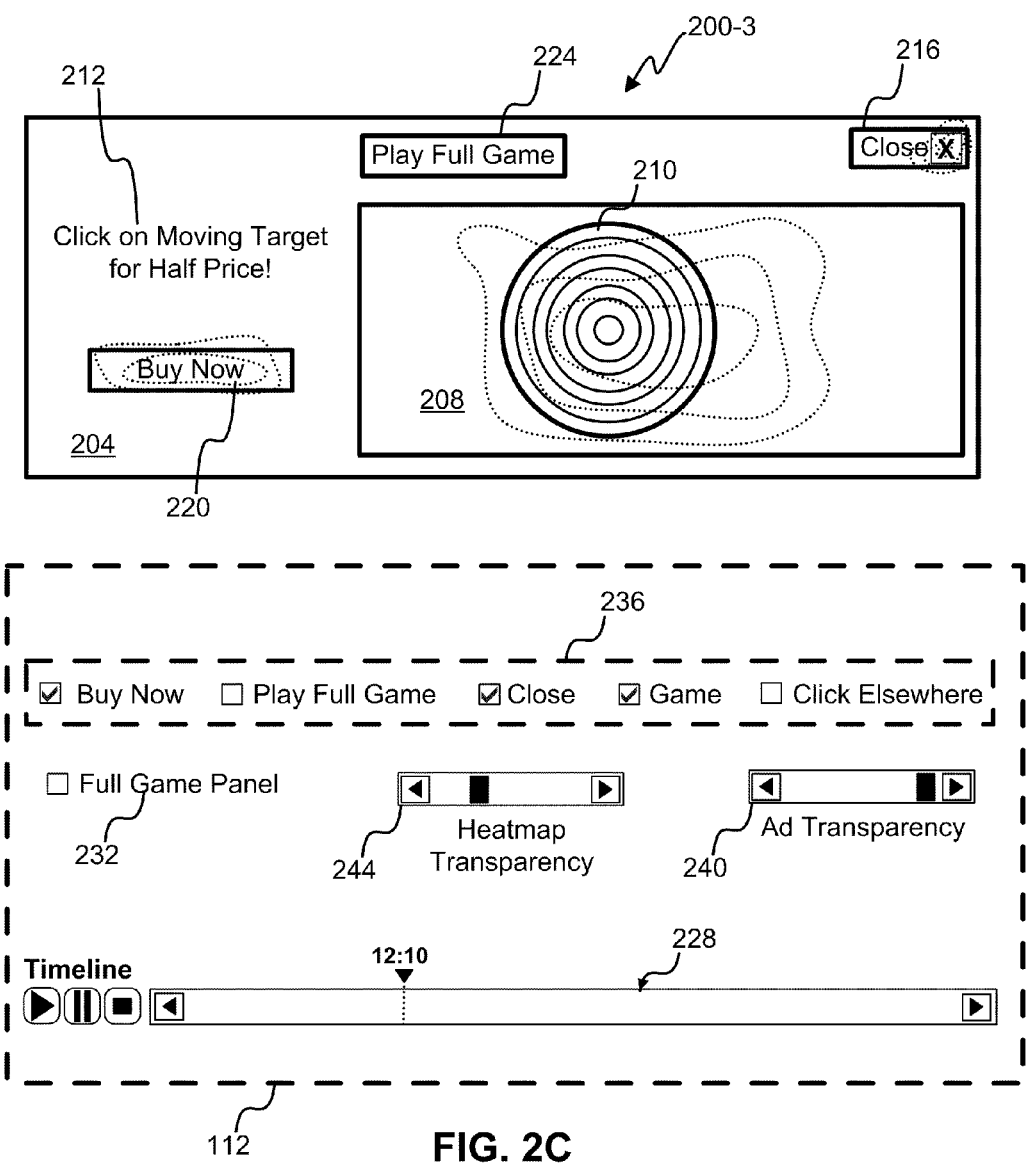

With reference to FIG. 2C, an embodiment of yet another view 200-3 from the visibility tracking interface 108 is shown. In this example, the heatmap transparency slider 244 has moved to the right to allow the graphic overlay to be partially translucent or have dashed lines. The user can adjust the heatmap transparency slider 244 to their preference so that the relevant information in the graphical overlay is easily visible.

Figure 2D:
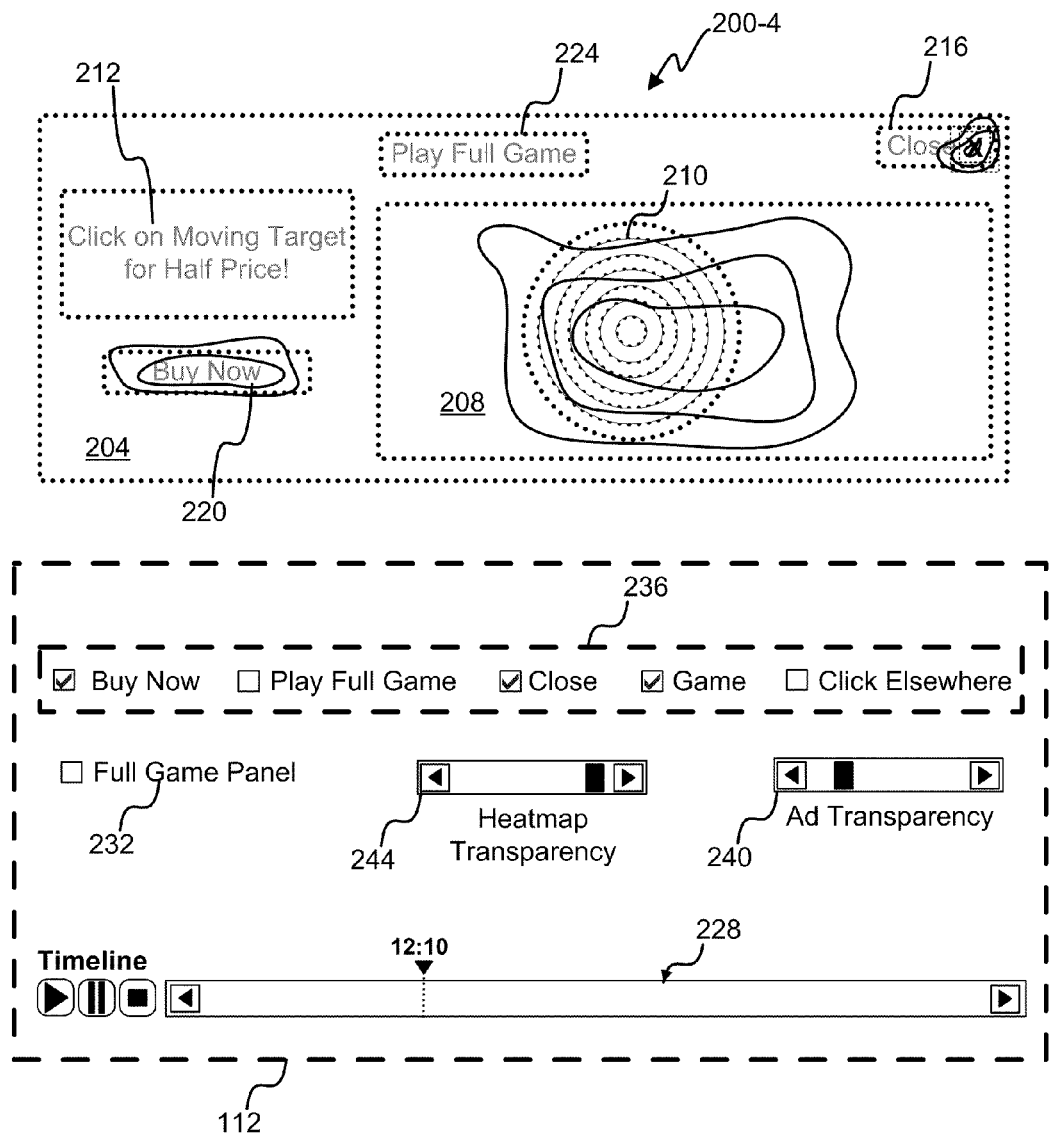

Referring next to FIG. 2D, an embodiment of still another view 200-4 from the visibility tracking interface 108 is shown. In this example, the creative transparency slider 240 has moved to the right to allow the creative 204 to be partially translucent, less dark or have dashed lines. By adjusting the creative transparency slider 240 an adjustment can be made according to user preference to see less of the creative.

Figure 2E:
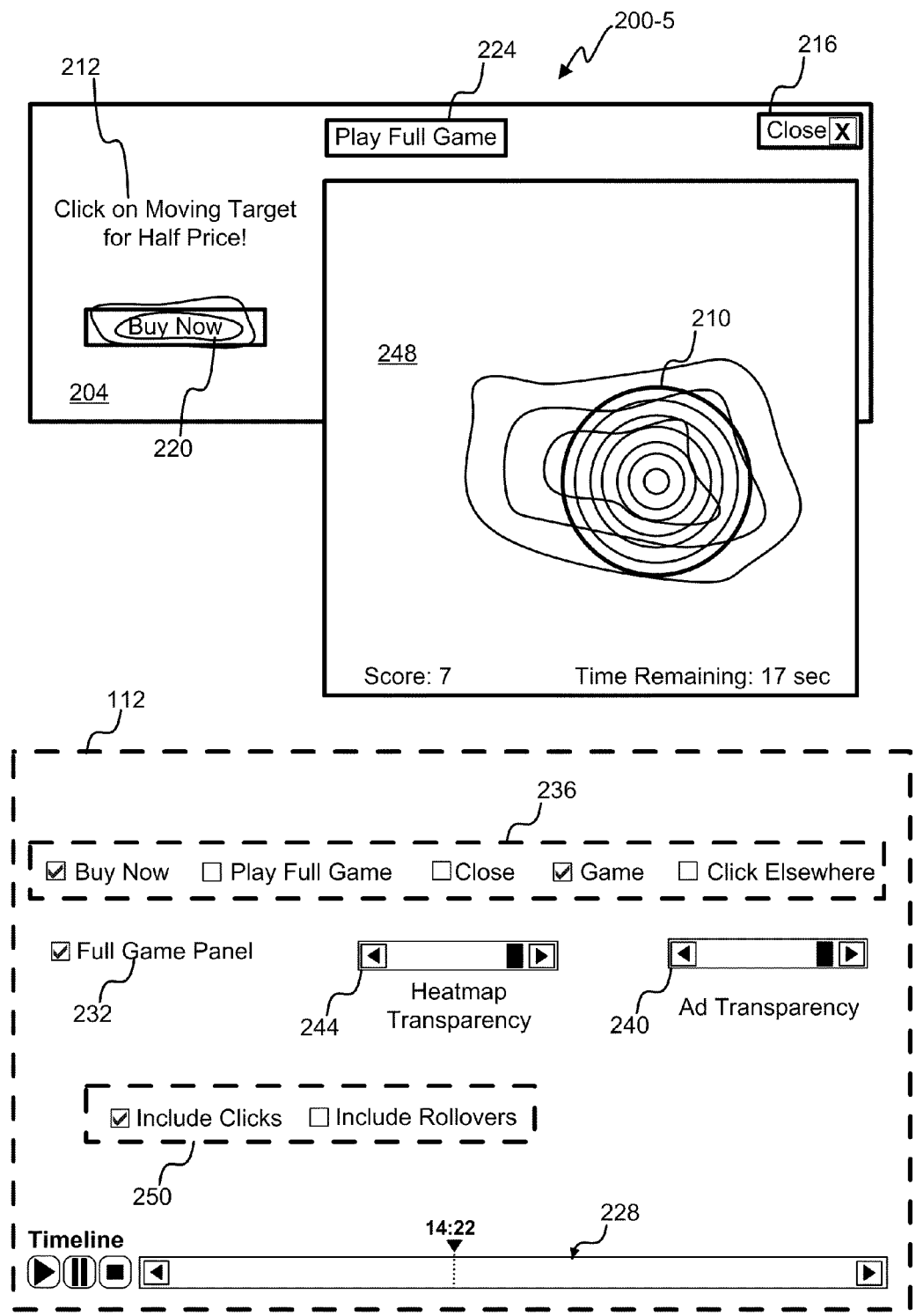

With reference to FIG. 2E, an embodiment of another view 200-5 from the visibility tracking interface 108 is shown. This example, shows the game element 208 expanded out into a game panel 248. The target 210 can move with two degrees of freedom along a predetermined, random or interactive path. For example, the target 210 could sense cursor position and move away. The graphical overlay for the target 210 could be for all instances where the target were in a particular location regardless of the point in playback. Where the movement of the target 210 is tied to playback, the graphical overlay can follow the target 210 as playback progresses. The translucency of the panel 248 can track popularity along with the creative transparency slider 240. In this example, most viewers are interacting with the panel 248 at fourteen seconds and twenty-two hundredths into the playback timeline.

Figure 2F:
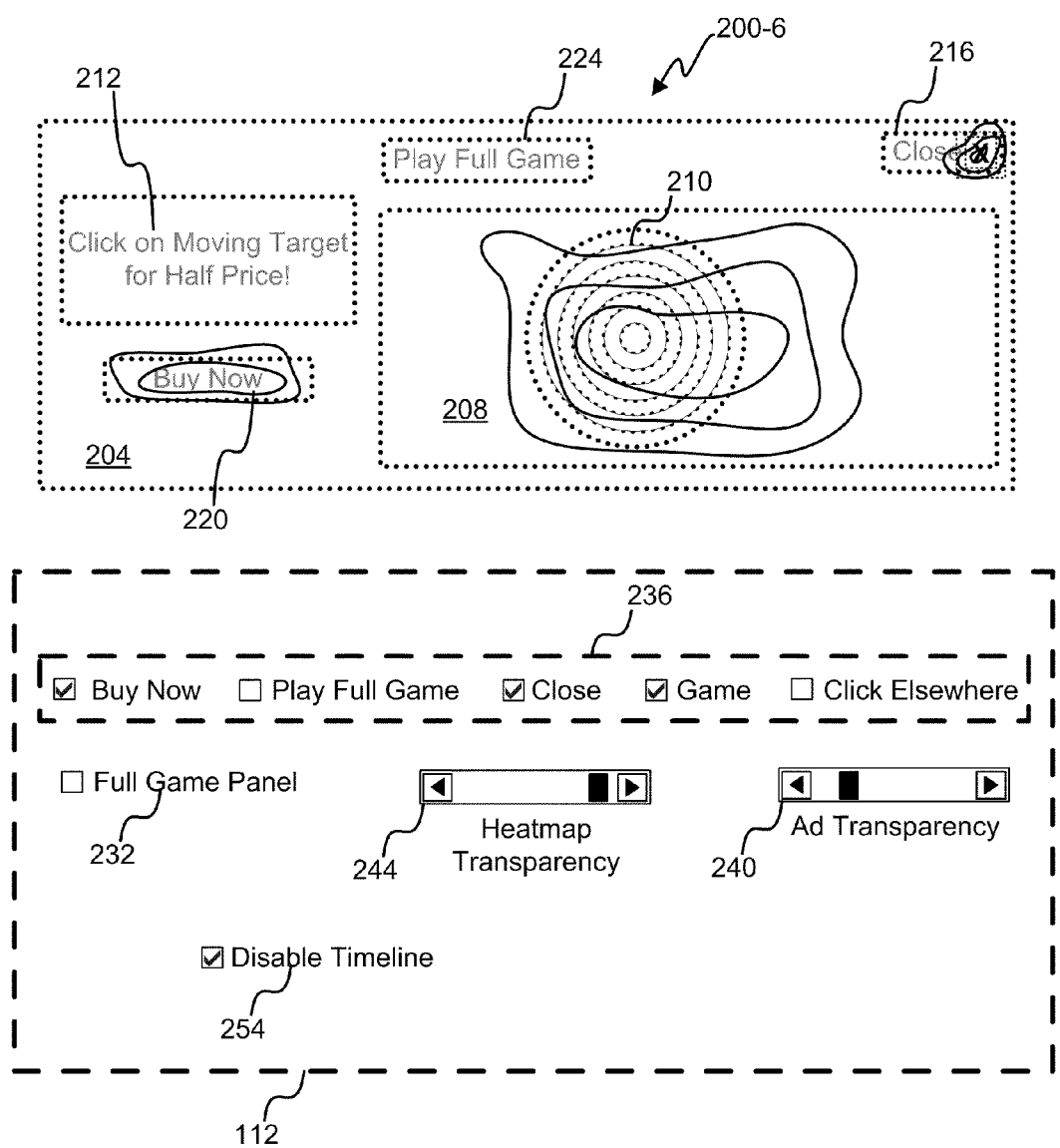

With reference to FIG. 2F, another embodiment of another view 200-6 from the visibility tracking interface 108 is shown. In this embodiment, the graphical overlay is summation of the selected interaction. The creative 204 is dynamic, but a timeline disable control 254 has been selected to remove the temporal nature of the dynamic overlay. In some embodiments, a creative that is static over time, would default to activation of the timeline disable control 254. When the timeline disable control 254 is not active, the timeline tool is displayed for manipulation.

Figure 2G:
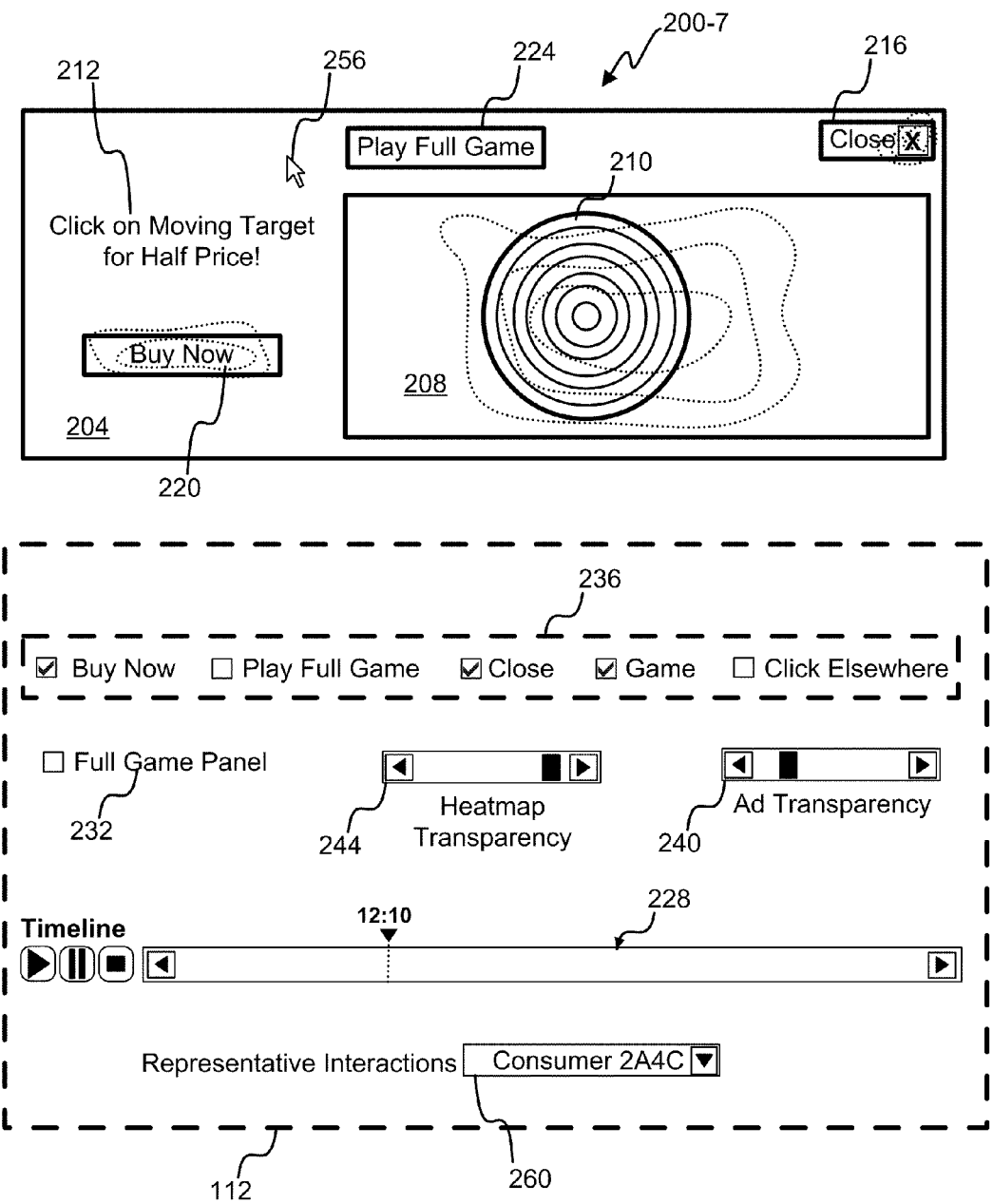

Referring next to FIG. 2G, another embodiment of yet another view 200-7 from the visibility tracking interface 108 is shown. In this embodiment, a representative consumer's interaction is also displayed for the creative 204. With a representative interactions control 260, the user can select from a number of individual interactions with the creative 204. A consumers pointer 256 shows where the consumer was interacting at the given point in the timeline 228. As the timeline progresses, the consumer pointer 256 will move and show where there is clicks and rollovers. There may be hundreds, thousands or more individual interactions with the creative 204 that could be shown, but an algorithm chooses representative interactions that can be selected by the representative interactions control 260. Other embodiments could allow selection from all the individual interactions.

Figure 2H:
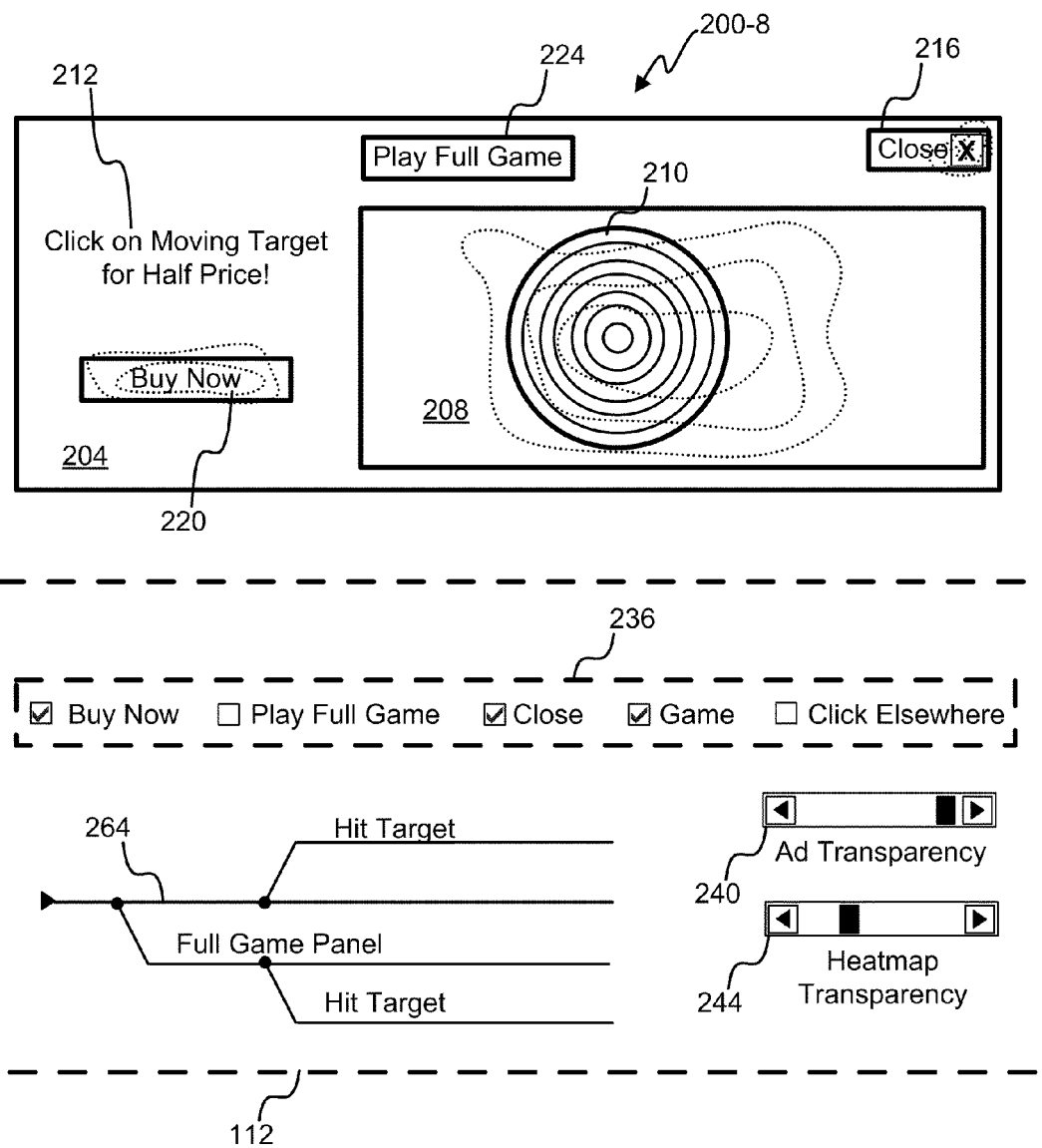

With reference to FIG. 2H, another embodiment of still another view 200-8 from the visibility tracking interface 108 is shown. In this embodiment, the user can select different branches that the creative 204 can take depending upon consumer interaction. The heatmap can be filtered according to the particular branch the creative 204 has taken. Each branch can be selected individually to display a heatmap with information exclusive to that particular branch and filter out the information gathered on other branches. In this rather simple creative 204, the consumer can activate the full game panel or not and hit a target or not. Other creatives could have many more branches.

Figure 3:
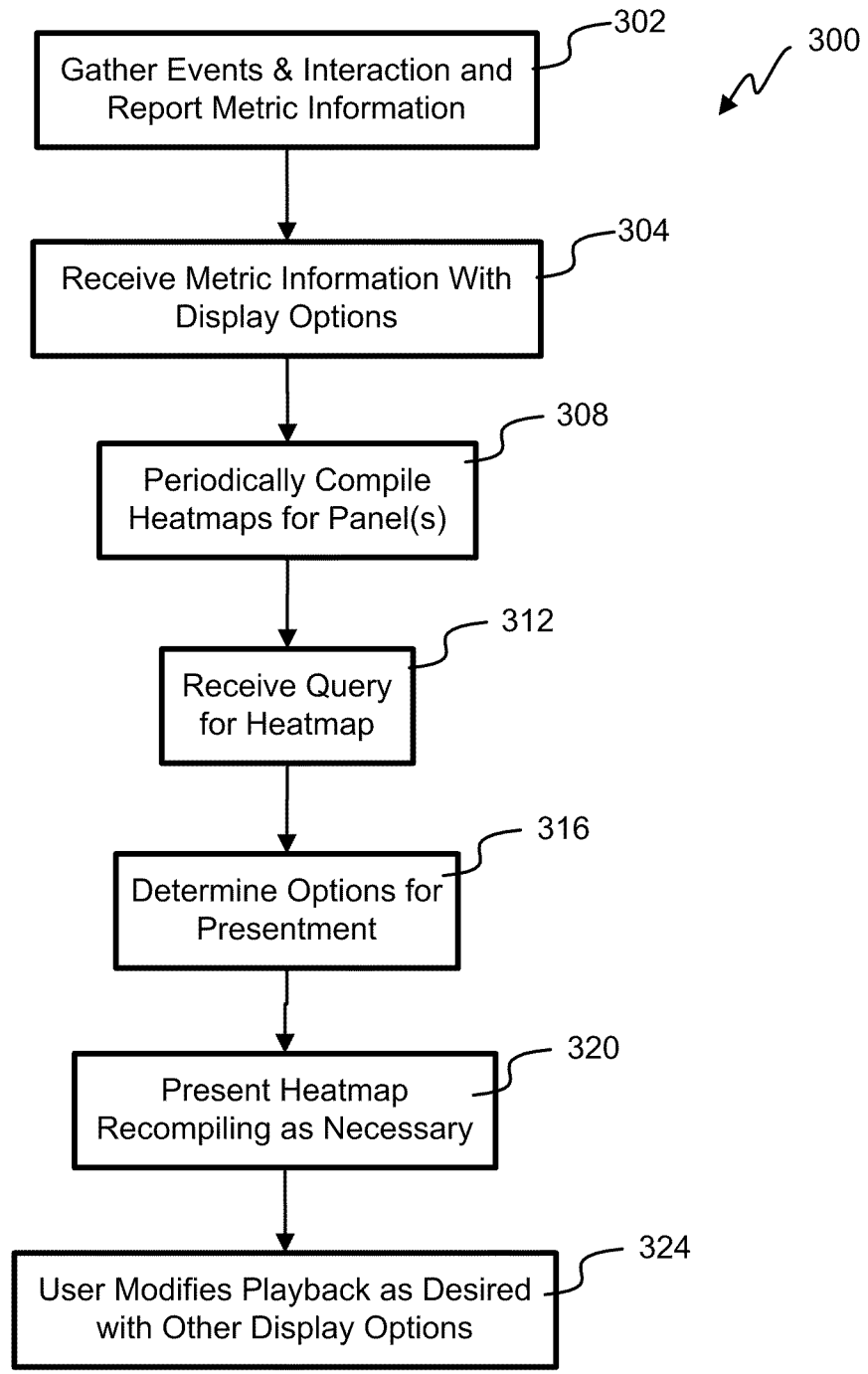
FIG. 3 illustrates a flowchart of an embodiment of a process for presenting graphic overlays for gathered metric information.

Referring next to FIG. 3, an embodiment of a process 300 for presenting graphic overlays for gathered metric information 120 is shown. The depicted portion of the process 300 begins in block 302, where events, rollovers and interaction are gathered from the viewer computing devices and reported back to the metric display system 100. Intermediaries such as CDNs, hosting services, analytics services, etc. may be involved in the gathering. The metric display system 100 receives the metric information 120 in block 304 along with display options 112 from the user. In block 308, the metric display system 100 can periodically compile graphical overlays according to the metric information 120 and display options 112 or do this after a query or at runtime. The compilation of graphical overlays could be for all panels, a selectable subset of the panels or just one panel.

At some point a particular query for a view of the graphical overlay on top of a creative 204 is requested in block 312 through the visibility tracking interface 108. Any display options 112 are determined in block 316. The user may iteratively select different display options 112. Once the display options 112 are selected, the indicated compiled heatmap 132 is retrieved and displayed. The user interacts with the timeline 228 as desired in block 324 to see the graphical overlay evolve in synchronization with playing of the dynamic creative 204.

A number of variations and modifications of the disclosed embodiments can also be used. For example, the above embodiments are described in the context of creatives, but interaction with anything displayed on a computer screen could characterized with an overlay graphic, for example, video display software could display its interaction as an overlay graphic.

Another variation allows screening the graphic overlay by target group. A target group is any combination of demographic or behavioral information know about the viewers. For example, the user can define a target group that includes females from 18-21 that are geographically near Denver. The graphical overlay and other interaction through the visibility tracking interface will work on metrics gathered for that target group.

Figure 4:
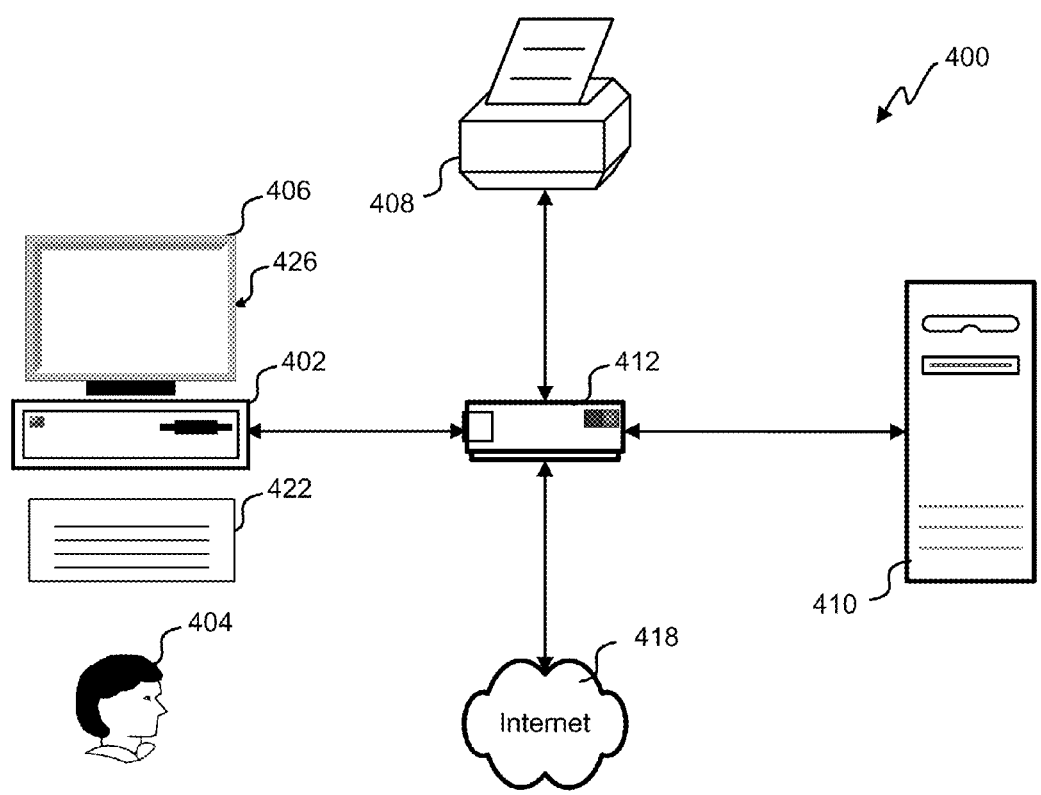
FIG. 4 depicts a block diagram of an embodiment of a computer system.

Referring next to FIG. 4, an exemplary environment with which embodiments may be implemented is shown with a computer system 400 that can be used by a designer 404 to design, for example, electronic designs. The computer system 400 can include a computer 402, keyboard 422, a network router 412, a printer 408, and a monitor 406. The monitor 406, processor 402 and keyboard 422 are part of a computer system 426, which can be a laptop computer, desktop computer, handheld computer, mainframe computer, etc. The monitor 406 can be a CRT, flat screen, etc.

A designer 404 can input commands into the computer 402 using various input devices, such as a mouse, keyboard 422, track ball, touch screen, etc. If the computer system 400 comprises a mainframe, a designer 404 can access the computer 402 using, for example, a terminal or terminal interface. Additionally, the computer system 426 may be connected to a printer 408 and a server 410 using a network router 412, which may connect to the Internet 418 or a WAN.

The server 410 may, for example, be used to store additional software programs and data. In one embodiment, software implementing the systems and methods described herein can be stored on a storage medium in the server 410. Thus, the software can be run from the storage medium in the server 410. In another embodiment, software implementing the systems and methods described herein can be stored on a storage medium in the computer 402. Thus, the software can be run from the storage medium in the computer system 426. Therefore, in this embodiment, the software can be used whether or not computer 402 is connected to network router 412. Printer 408 may be connected directly to computer 402, in which case, the computer system 426 can print whether or not it is connected to network router 412.

Figure 5:
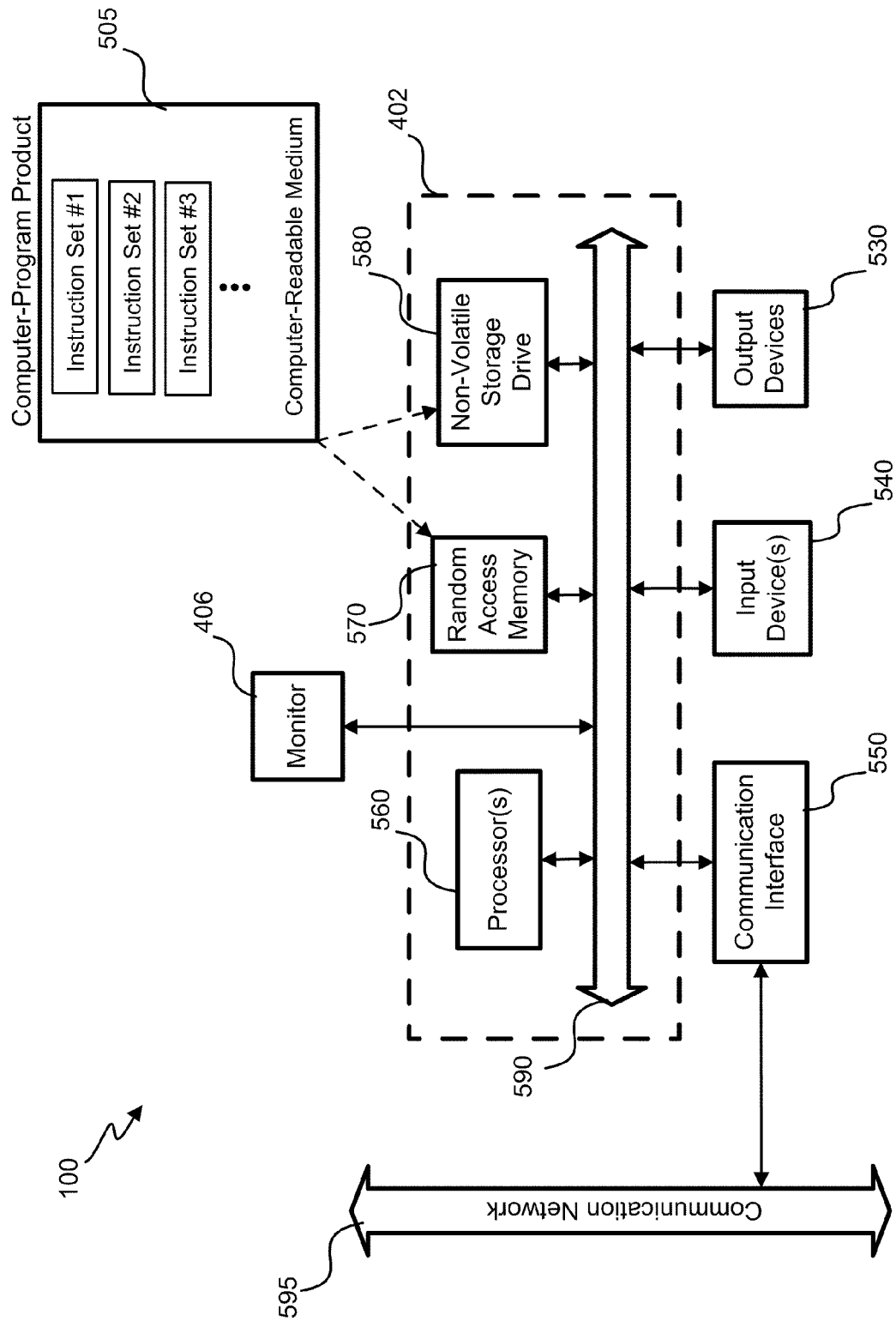
FIG. 5 depicts a block diagram of an embodiment of a special-purpose computer system.

With reference to FIG. 5, an embodiment of a special-purpose computer system 100 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 426, it is transformed into the special-purpose computer system 100.

Special-purpose computer system 100 comprises a computer 402, a monitor 406 coupled to computer 402, one or more additional user output devices 530 (optional) coupled to computer 402, one or more user input devices 540 (e.g., keyboard, mouse, track ball, touch screen) coupled to computer 402, an optional communications interface 550 coupled to computer 402, a computer-program product 505 stored in a tangible computer-readable memory in computer 402. Computer-program product 505 directs system 100 to perform the above-described methods. Computer 402 may include one or more processors 560 that communicate with a number of peripheral devices via a bus subsystem 590. These peripheral devices may include user output device(s) 530, user input device(s) 540, communications interface 550, and a storage subsystem, such as random access memory (RAM) 570 and non-volatile storage drive 580 (e.g., disk drive, optical drive, solid state drive), which are forms of tangible computer-readable memory.

Computer-program product 505 may be stored in non-volatile storage drive 580 or another computer-readable medium accessible to computer 402 and loaded into memory 570. Each processor 560 may comprise a microprocessor, such as a microprocessor from Intel® or Advanced Micro Devices, Inc.®, or the like. To support computer-program product 505, the computer 402 runs an operating system that handles the communications of product 505 with the above-noted components, as well as the communications between the above-noted components in support of the computer-program product 505. Exemplary operating systems include Windows® or the like from Microsoft Corporation, Solaris® from Oracle®, LINUX, UNIX, and the like.

User input devices 540 include all possible types of devices and mechanisms to input information to computer system 402. These may include a keyboard, a keypad, a mouse, a scanner, a digital drawing pad, a touch screen incorporated into the display, audio input devices such as voice recognition systems, microphones, and other types of input devices. In various embodiments, user input devices 540 are typically embodied as a computer mouse, a trackball, a track pad, a joystick, wireless remote, a drawing tablet, a voice command system. User input devices 540 typically allow a user to select objects, icons, text and the like that appear on the monitor 406 via a command such as a click of a button or the like. User output devices 530 include all possible types of devices and mechanisms to output information from computer 402. These may include a display (e.g., monitor 406), printers, non-visual displays such as audio output devices, etc.

Communications interface 550 provides an interface to other communication networks and devices and may serve as an interface to receive data from and transmit data to other systems, WANs and/or the Internet 418. Embodiments of communications interface 550 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 550 may be coupled to a computer network, to a FireWire® bus, or the like. In other embodiments, communications interface 550 may be physically integrated on the motherboard of computer 402, and/or may be a software program, or the like.

RAM 570 and non-volatile storage drive 580 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 570 and non-volatile storage drive 580 may be configured to store the basic programming and data constructs that provide the functionality of various embodiments of the present invention, as described above.

Software instruction sets that provide the functionality of the present invention may be stored in RAM 570 and non-volatile storage drive 580. These instruction sets or code may be executed by the processor(s) 560. RAM 570 and non-volatile storage drive 580 may also provide a repository to store data and data structures used in accordance with the present invention. RAM 570 and non-volatile storage drive 580 may include a number of memories including a main random access memory (RAM) to store of instructions and data during program execution and a read-only memory (ROM) in which fixed instructions are stored. RAM 570 and non-volatile storage drive 580 may include a file storage subsystem providing persistent (non-volatile) storage of program and/or data files. RAM 570 and non-volatile storage drive 580 may also include removable storage systems, such as removable flash memory.

Bus subsystem 590 provides a mechanism to allow the various components and subsystems of computer 402 communicate with each other as intended. Although bus subsystem 590 is shown schematically as a single bus, alternative embodiments of the bus subsystem may utilize multiple busses or communication paths within the computer 402.

While the principles of the disclosure have been described above in connection with specific apparatuses and methods, it is to be clearly understood that this description is made only by way of example and not as limitation on the scope of the disclosure.

What is claimed is:

1. A method for a plurality of dynamic individual interactions mapping for online advertizing, the method comprising:
   receiving metric information, using computer hardware, relating to interaction with a creative advertisement from across the Internet for a plurality of viewers, wherein the metric information is correlated to playback time of the creative advertisement and position relative to the creative advertisement;
   determining display options using computer hardware;
   formulating a graphic overlay to display the metric information according to display options, playback time and position using computer hardware; and
   sending, using computer hardware, the graphic overlay for presentment, wherein the graphic overlay changes according to the playback time of the creative advertisement.

2. The method for dynamic interaction mapping for online advertizing as recited in claim 1, wherein the display options include a selection from a plurality of interactions.

3. The method for dynamic interaction mapping for online advertizing as recited in claim 1, wherein the graphic overlay is a heatmap.

4. The method for dynamic interaction mapping for online advertizing as recited in claim 1, wherein the graphic overlay uses different colors for different interaction.

5. The method for dynamic interaction mapping for online advertizing as recited in claim 1, wherein the creative advertisement is dynamic and changes over the playback time.

6. The method for dynamic interaction mapping for online advertizing as recited in claim 1, wherein the formulating compiles the graphic overlay according to the display options and playback time.

7. The method for dynamic interaction mapping for online advertizing as recited in claim 1, wherein the display options include:
   a transparency selection that specifies transparency of either the graphic overlay or the creative advertisement; or
   indication that rollovers should be included in the graphic overlay.

8. The method for dynamic interaction mapping for online advertizing as recited in claim 1, wherein the graphic overlay changes with the playback time.

9. One or more non-transitory physical-machine-readable media storing machine-executable instructions configured for a plurality of dynamic individual interactions mapping for online advertizing, comprising code for:
   receiving metric information relating to interaction with a creative advertisement from across the Internet for a plurality of viewers, wherein the metric information is correlated to playback time of the creative advertisement and position relative to the creative advertisement;
   determining display options;
   formulating a graphic overlay according to display options, playback time and position; and
   sending the graphic overlay for presentment, wherein the graphic overlay changes according to playback time.

10. The one or more physical machine-readable media having machine-executable instructions configured for dynamic interaction mapping for online advertizing as recited in claim 9, wherein the graphic overlay is a heatmap.

11. The one or more physical machine-readable media having machine-executable instructions configured for dynamic interaction mapping for online advertizing as recited in claim 9, wherein the creative advertisement is dynamic and changes over the playback time.

12. The one or more physical machine-readable media having machine-executable instructions configured for dynamic interaction mapping for online advertizing as recited in claim 9, wherein the code for formulating compiles the graphic overlay according to the display options and playback time.

13. The one or more physical machine-readable media having machine-executable instructions configured for dynamic interaction mapping for online advertizing as recited in claim 9, wherein the graphic overlay changes with the playback time.

14. A metric display system for a plurality of dynamic individual interactions mapping for online advertizing, the metric display system comprising:
   a memory; and
   a processor, configured to:
      receive metric information relating to interaction with a creative advertisement from across the Internet for a plurality of viewers, wherein the metric information is correlated to playback time of the creative advertisement and position relative to the creative advertisement;
      determine display options;
      formulate a graphic overlay according to display options, playback time and position; and
      send the graphic overlay for presentment, wherein the graphic overlay changes according to playback time.

15. The metric display system for dynamic interaction mapping for online advertizing as recited in claim 14, wherein the display options include a selection from a plurality of interactions.

16. The metric display system for dynamic interaction mapping for online advertizing as recited in claim 14, wherein the graphic overlay is a heatmap.

17. The metric display system for dynamic interaction mapping for online advertizing as recited in claim 14, wherein the creative advertisement is dynamic and changes over the playback time.

18. The metric display system for dynamic interaction mapping for online advertizing as recited in claim 14, wherein the display options include a transparency selection that specifies transparency of either the graphic overlay or the creative advertisement.

19. The metric display system for dynamic interaction mapping for online advertizing as recited in claim 14, wherein the graphic overlay changes with the playback time.

20. The metric display system for dynamic interaction mapping for online advertizing as recited in claim 14, wherein the graphic overlay is filtered to include only a selected panel for the creative advertisement.

\* \* \* \* \*